United States Patent Office 2,949,468
Patented Aug. 16, 1960

2,949,468
PROCESS OF EXTRACTING PYRIDINE CARBOXYLIC ACIDS AS BISULFATES

Louis L. Zempliner, 276 Riverside Drive, New York, N.Y.

No Drawing. Filed Mar. 19, 1958, Ser. No. 722,373

2 Claims. (Cl. 260—295.5)

This invention provides an improved process for the separation of pyridinecarboxylic acids from sulfuric acid, the acids being recovered in the form of their bisulfate salts.

Pyridinecarboxylic acids, such as nicotinic acid, isonicotinic acid, cinchomeronic acid and other substituted pyridinecarboxylic acids, of which nicotinic acid is the most important industrially, are frequently produced by the oxidation of corresponding n-heteroaryl compounds by nitric and sulfuric acid with or without the use of a catalyst. The oxidation masses produced in this procedure are generally dark, viscous liquids of high density (1.65 to 1.75) containing 20 to 30% of the pyridinecarboxylic acid, 3 to 4% of water, traces of nitrosylsulfuric acid, impurities and decomposition products, with the balance sulfuric acid.

Various procedures for the recovery of the pyridinecarboxylic acids from such reaction masses have been suggested and used. Among them are procedures involving dilution, neutralization and precipitation of the pyridinecarboxylic acid as its copper salt, followed by recovery of the free acid from the copper salt by decomposition with caustic soda, filtration, precipitation of the free acid by pH adjustment, etc. Another procedure involves the addition of measured quantities of water to the reaction mass with precipitation of pyridinecarboxylic acid bisulfate crystals in the resulting dilute acid. Recovery with each step is low, the acid must be concentrated or reinforced with sulfur trioxide for reuse and a substantial amount of the pyridinecarboxylic acid and practically all of the impurities are necessarily recycled. Another procedure involves the addition to the reaction mass of a large volume of a liquid aliphatic acid, filtering off the precipitated pyridinecarboxylic acid bisulfate and then treating the mother liquor with water followed by separation of the organic acid (for reuse) and the sulfuric acid. Organic acid losses are substantial in this procedure.

The present invention is based on the discovery that sulfuric acid-stable ketones, esters and ethers, if soluble in concentrated sulfuric acid, when used in a volume somewhat greater than the reaction mass, upon admixture with the reaction mass precipitate the pyridinecarboxylic acid in the form of its bisulfate almost quantitatively and in great purity. Advantageously from 3 to 5 volumes of solvent are used for each volume of reaction mass. The precipitated crystalline carboxylic acid bisulfate is readily separated from the mixture of the reaction mass with the ketone, ester or ether. Treatment of the remaining liquid phase (mother liquor) with water brings about separation of the sulfuric acid and the organic solvent, which can then be reused in the procedure, the aqueous phase containing practically all of the sulfuric acid originally present in the reaction mass together with some of the impurities.

The purified bisulfate obtained is readily worked up for the production of the desired pyridinecarboxylic acid without the handling of large volumes of solution and, indeed, without the repeated recrystallization heretofore required for the production of a relatively pure product.

Organic solvents which are advantageously used in the practice of the present invention are the liquid ketones containing more than 4 carbon atoms, including methyl isobutyl ketone, methyl isopropyl ketone, di-isobutyl ketone, methyl-n-amyl ketone, cyclohexanone and acetophenone. Acetone and methyl-ethyl ketone are not suitable for use because they are decomposed by the sulfuric acid.

Useful ethers include di-isopropyl ether, n-dibutyl ether, anisol, tetrahydrofurane and ethylene glycol di-n-butyl ether. Dimethyl ether and diethyl ether are too sensitive to sulfuric acid to be useful, while dioxane forms a solid addition compound. Useful esters include methyl acetate, ethyl acetate, isopropyl acetate, n-butyl acetate, ethyl benzoate and other liquid carboxylic acid esters.

These oxygen-containing solvents may be used singly or in combination. It appears to be important to choose a solvent which forms a soluble oxonium compound with sulfuric acid under the substantially anhydrous conditions used in mixing the solvent with the reaction mass. It is also desirable to use a solvent of low viscosity, low vapor pressure, low specific gravity and low solubility in water as such solvents are more easily recovered for reuse in the process after the pyridinecarboxylic acid has been removed and water has been added to bring about separation of the sulfuric acid and the solvent.

While I do not wish to be bound by any theory as to the mechanism involved in the separation operation of the present invention, I believe that the ether, ester or ketone forms with the sulfuric acid an oxonium compound, that in the case of the solvents used in the practice of the invention, the value of the van t'Hoff factor "$i$" is close to 2 and the formation of the insoluble pyridinecarboxylic acid salts results from the formation of ionized oxonium compounds between the sulfuric acid and the solvent. After separation of the pyridinecarboxylic acid bisulfate, the solvent is recovered by treatment of the oxonium compound solution with water, with decomposition of the oxonium compound and regeneration of the free solvent which is insoluble in the diluted sulfuric acid.

The invention will be illustrated by the following examples but it is not limited thereto.

*Example I*

To 100 parts by weight of a crude reaction mass containing 24% nicotinic acid, 73% sulfuric acid and 3% of water, impurities and nitrosylsulfuric acid are added with vigorous stirring 350 parts by weight of commercial methyl isobutyl ketone. The mass assumes a dark red color. It is initially pasty but after some stirring separates into a crystalline phase and a red liquid phase. The temperature rises spontaneously to 35 to 40° C. Stirring is continued for ½ hour, the mass is allowed to cool to room temperature and the crystals removed by suction filtration or centrifuging. The well-pressed cake is washed with about 30 parts of the same ketone and air dried. A buff crystalline mass, weighing, air dried, 46 parts and containing 42.6 parts of nicotinic acid bisulfate (99.1% yield) with the remainder impurities, moisture and residual ketone is obtained. The mother liquor to which is added the wash liquor is stirred with 100 parts of water, with formation of two layers. The upper layer, the ketone layer, is separated and washed with 50 parts of water. After separation, 370 parts of clear ketone are obtained which are immediately available for reuse. The water layers contain practically all of the free sulfuric acid originally present and about 5 parts of the ketone. The crystal cake is worked up by any known method to produce pure nicotinic acid.

Example II

The same procedure is used as in Example I except that 350 parts of n-dibutyl ether and 35 parts of cyclohexanone are used in place of the 350 parts of methyl isobutyl ketone. The small amount of cyclohexanone is included because the dibutyl ether when used alone gives a pasty mass which requires an inconveniently long time of stirring for effective separation of the crystals. 51 parts of cake (air dried) are obtained containing 41 parts of nicotinic acid bisulfate (95% yield), 3 parts of impurities, 5 parts of adhering solvent and 2 parts of moisture with traces of free sulfuric acid. The washed organic layer is enriched with 10 parts of cyclohexanone and reused.

Example III

The procedure of Example I is repeated except that 350 parts of ethylene glycol dibutyl ether (dibutyl Cellosolve) are used. Initially, an almost homogeneous mass is obtained which is stirred for 30 minutes and then seeded with nicotinic acid bisulfate crystals. Stirring is then continued for another ½ hour and separation then effected. The crystal cake obtained is washed with 20 parts of acetone and on air drying gives 46.5 parts of product consisting of 42 parts of nicotinic acid bisulfate (97% yield) with the remainder impurities and a small amount of sulfuric acid.

Example IV

The same procedure is followed as in Example I except that 350 parts of butyl acetate are used and during the stirring and separating operations the mass is maintained at 10° C. The nicotinic acid bisulfate is almost quantitatively recovered.

Results similar to those obtained in Examples I through IV are obtained with the use of tetrahydrofurane, where again cooling is useful and with which the recovery of the solvent is not as clean-cut, or with other of the ester, ether or ketone solvents such as those listed above.

Example V 100 parts of solution consisting of 20 parts of isonicotinic acid, 4 parts of water and 76 parts of sulfuric acid are stirred with 350 parts of n-butyl acetate with cooling to maintain the temperature at or below 10° C. After 30 minutes the crystals are separated and the mother liquor treated with water to recover the solvent. The air dried crystalline cake weighs 39.2 parts and contains 34.7 parts of isonicotinic acid bisulfate (96.5% yield).

Similar results are obtained with other pyridinecarboxylic acids, such as cinchomeronic acid, as all of the various pyridinecarboxylic acid bisulfates exhibit the same phenomenon of insolubility in the oxonium compounds of the sulfuric acid with the ketone, ether or ester, that is, solvents which form oxonium compounds with the concentrated sulfuric acid having van t'Hoff factors approximating 2.

I claim:
1. The process of recovering pyridine-carboxylic acids as bisulfates from mixtures of such acids with concentrated sulfuric acid which includes admixing such mixture with at least its own volume of a liquid, sulfuric acid stable oxygenated organic solvent selected from the group consisting of (a) ketones selected from the group consisting of acetophenone, and dialkyl and cycloalkyl alkyl ketones having only one carbonyl group and from 4 to 9 carbon atoms, (b) esters containing up to 9 carbon atoms of the group consisting of ethyl benzoate and acetates of alkanols, and (c) ethers selected from the group consisting of dialkyl ethers, said ethers having more than 4 and up to 8 carbon atoms, tetrahydrofurane, anisol and the lower alkyl diether compounds of ethylene glycol and diethylene glycol; said compounds being composed solely of carbon, hydrogen and oxygen.

2. The process as in claim 1 in which the pyridine-carboxylic acid is nicotinic acid.

No references cited.